United States Patent [19]

Conroy

[11] Patent Number: 4,839,409

[45] Date of Patent: Jun. 13, 1989

[54] STABILIZERS FOR RIGID HALOGEN-CONTAINING ORGANIC POLYMERS COMPRISING A PRIMARY HEAT STABILIZER AND AN ESTER OF A POLYHYDROCARBYL ETHER GLYCOL

[75] Inventor: Gary M. Conroy, Cincinnati, Ohio

[73] Assignee: Morton Thiokol, Inc., Chicago, Ill.

[21] Appl. No.: 98,754

[22] Filed: Sep. 17, 1987

Related U.S. Application Data

[63] Continuation of Ser. No. 945,782, Dec. 23, 1986, abandoned.

[51] Int. Cl.$^4$ .................. C08K 5/57; C08K 5/56; C08K 5/09; C08K 5/10
[52] U.S. Cl. ............................ 524/179; 252/400.1; 252/400.52; 252/400.53; 252/400.54; 524/180; 524/308; 524/327; 524/399; 524/400; 524/301
[58] Field of Search ........... 252/400.1, 400.52, 400.53, 252/400.54; 524/179, 180, 308, 399, 400, 327

[56] References Cited

U.S. PATENT DOCUMENTS

| | | | |
|---|---|---|---|
| 2,193,662 | 3/1940 | Alexander | 260/88 |
| 2,285,420 | 6/1942 | Doolittle | 260/36 |
| 2,297,290 | 9/1942 | D'Alelio | 260/36 |
| 2,349,414 | 5/1944 | Ferrer et al. | 524/308 |
| 2,395,581 | 2/1945 | Richter | 260/36 |
| 2,404,313 | 10/1946 | Rodman | 117/161 |
| 2,498,532 | 2/1950 | Dean | 260/31.8 |
| 2,539,362 | 1/1951 | Darby | 260/30.6 |
| 2,555,062 | 6/1951 | Small et al. | 260/31.6 |
| 2,562,204 | 9/1951 | Milton | 18/58 |
| 2,579,219 | 12/1951 | Vander Valk | 260/31.4 |
| 2,581,008 | 1/1952 | Emerson et al. | 260/483 |
| 2,608,578 | 8/1952 | Weesner | 260/484 |
| 2,647,098 | 7/1953 | Smith | 260/31.4 |
| 2,647,099 | 7/1953 | Smith | 260/31.6 |
| 2,657,186 | 10/1953 | Klein et al. | 524/308 |
| 2,691,663 | 10/1954 | Smith | 260/410.6 |
| 2,695,279 | 11/1954 | Wollaston | 260/31.6 |
| 2,744,877 | 5/1956 | Smith | 260/31.4 |
| 2,786,041 | 3/1957 | Dazzi | 260/31.4 |
| 2,802,016 | 8/1957 | Dazzi | 260/404.8 |
| 2,820,802 | 1/1958 | Sprang et al. | 260/404.8 |
| 2,823,192 | 2/1958 | Elwell et al. | 260/31.4 |
| 2,870,111 | 1/1959 | Dazzi | 260/31.8 |
| 2,886,545 | 5/1959 | Rhodes et al. | 260/27 |
| 2,886,590 | 5/1959 | Montgomery | 260/484 |
| 2,893,967 | 7/1959 | Dazzi | 260/31.8 |
| 3,173,888 | 3/1965 | Von Bramer | 260/31.8 |
| 3,463,751 | 8/1969 | Hasegawa et al. | 524/178 |
| 3,479,308 | 11/1969 | Gattenby et al. | 524/114 |
| 3,644,259 | 2/1972 | Kobyiak | 260/29.6 |
| 3,671,572 | 6/1972 | Driscoll | 260/485 G |
| 3,759,856 | 9/1973 | Rhodes et al. | 260/23 XA |
| 3,766,106 | 10/1973 | Yurimoto et al. | 260/17 A |
| 3,835,116 | 9/1974 | Lydick | 260/17.4 |
| 3,957,712 | 5/1976 | Heyden et al. | 524/308 |
| 4,060,508 | 11/1977 | Sugahara et al. | 524/141 |
| 4,072,647 | 2/1978 | Schneider | 260/31.8 R |
| 4,146,518 | 3/1979 | Minagawa et al. | 260/23 XA |
| 4,147,686 | 4/1979 | Heckles et al. | 260/31.8 R |
| 4,217,258 | 8/1980 | Minagawa et al. | 260/23 XA |
| 4,330,452 | 5/1982 | Cook | 524/308 |
| 4,360,619 | 11/1982 | Kugele et al. | 524/181 |

FOREIGN PATENT DOCUMENTS

| | | |
|---|---|---|
| 0100113 | 2/1984 | European Pat. Off. |
| 1109944 | 3/1975 | Japan . |
| 53-57245 | 5/1978 | Japan . |
| 3067757 | 6/1978 | Japan . |
| 3128653 | 11/1978 | Japan . |
| 4112957 | 4/1979 | Japan . |
| 5021410 | 2/1980 | Japan . |
| 5125144 | 9/1980 | Japan . |
| 59-164352 | 9/1984 | Japan . |

OTHER PUBLICATIONS

J. E. Todd—"Stabilization of Polymer Types", pp. 239–255 in *Plasticizers, Stabilizers and Fillers*, P. D. Ritchie, editor (1972).

*Primary Examiner*—Veronica P. Hoke
*Attorney, Agent, or Firm*—George W. Rauchfuss, Jr.; Richard J. Sheridan; Gerald K. White

[57] ABSTRACT

Compositions for stabilizing rigid (unplasticized) halogen-containing organic polymers against the deteriorative effects of heat, ultra-violet light and weathering comprise organotin or non-tin metal salt primary heat stabilizers in combination with esters of polyhydrocarbyl ether glycols.

24 Claims, No Drawings

STABILIZERS FOR RIGID HALOGEN-CONTAINING ORGANIC POLYMERS COMPRISING A PRIMARY HEAT STABILIZER AND AN ESTER OF A POLYHYDROCARBYL ETHER GLYCOL

This is a continuation of co-pending application Ser. No. 945,782 filed on Dec. 23, 1986, now abandoned.

FIELD OF THE INVENTION

This invention relates to compositions for stabilizing rigid (unplasticized) halogen-containing polymers against the deteriorative effects of heat, ultra-violet light and weathering. The stabilizing compositions comprise organotin or non-tin metal salt primary heat stabilizers in combination with esters of polyhydrocarbyl ether glycols. The invention also relates to halogen-containing organic polymers stabilized with such compositions and to a process for stabilizing halogen-containing organic polymers with such compositions.

BACKGROUND OF THE INVENTION

It has been known that halogen-containing organic polymers, especially the commerically important polyvinyl chloride polymers, are subject to deterioration or degradation when exposed to the deleterious effects of heat, light (especially ultra-violet light) and weathering. Various compounds and compositions have been proposed and utilized to stabilize these polymers against such degradation and deterioration. For the most part, these stabilizers have primarily been directed toward stabilization against the effects of heat, such as that encountered during processing of the polymer and fabrication thereof into articles. Among these primary heat stabilizers some of the most important and effective have been a wide variety of organotin compounds and non-tin metal salts.

Among the organotin compounds found to be effective heat stabilizers for halogen-containing polymers are organotin sulfides and mercaptides and organotin carboxylates and organotin mercaptocarboxylates. Among the non-tin metal salts found to be effective to stabilize said polymers there may be mentioned the antimony, barium, calcium, cadmium, zinc salts such as mercaptides, carboxylates and phenolates.

While these stabilizers have been quite effective as heat stabilizers for halogen-containing organic polymers they have generally only offered a modicum of light and weathering stabilization to the polymers. Yet, with the increasing use of halogen-containing organic polymers for rigid articles which will be exposed to light and outdoor weathering for extended periods of time, such as housing siding and window profiles, it has become increasingly important to develop a stabilizer which will not only protect the polymer against the high temperatures and heat encountered during processing and fabrication but will also protect the polymer against the extended and long-term effect of ultra-violet light and weathering as well.

It has also been known that plastic dispersions or pastes of vinyl chloride polymers or the like are plasticized by using as hydrophilic plasticizers, a hydriphilic fatty acid ester of a polyoxyalkylene glycol of a molecular weight of about 200 to 400 such as, for example, as disclosed in U.S. Pat. No. 3,957,712, issued May 18, 1976, to Heyden et al. Such hydrophilic plasticizers, when used in PVC plastic at plasticizing levels of 5 to 10% by weight, also impart antistatic properties and greater water vapor absorption properties. Similarly, U.S. Pat. No. 2,349,414, issued May 23, 1944, to Ferrer et al, discloses adding a plasticizing amount of from about 15 to 55% by weight of esters such as triethylene glycol di(2-ethylhexoate) and triethylene glycol di(2-ethylbutyrate) as plasticizers for colloidal dispersions of vinyl halide resins. The patentees state that organometallic compounds may be added to such compositions to increase the resistance of the plasticized plastic compositions to deterioration from light and heat.

In U.S. Pat. No. 3,479,308, issued Nov. 18, 1969 to Gattenby, Jr. et al, it is disclosed that by the addition of a combination of both (1) a partial ester of a water-soluble $C_{2-6}$ polyol with a $C_{12-18}$ aliphatic monocarboxylic acid and (2) a polyalkoxylated derivatives of a partial ester of a water soluble $C_{2-6}$ polyol and a $C_{12-18}$ aliphatic monocarboxylic acid, the alkoxylated groups each having between 2-3 carbon atoms and the number of alkoxy groups being 3-30 per molecule of the alkoxylated partial ester, to plasticized vinyl chloride films there is imparted antifogging and antitackifying properties to the films. The patentees state that conventional metal salt stabilizers may be added to the plasticized film.

U.S. Pat. No. 4,060,508, issued Nov. 29, 1977 to Sugahara et al, discloses that chlorine-containing polymers have a much reduced tendency to blow at the molding step if a silicate of a Group II and IV metal or composites of silicate acid with oxides, hydroxides and carbonates of said metals is employed along with organic additives having a boiling point or decomposition point higher than a chlorine-containing polymer processing temperature. Among the multitude of organic additives disclosed there is mentioned, at column 12, lines 13 and 14, a polyethylene glycol monofatty acid ester. The patent also mentions, at column 13, lines 6 to 9 and 37 to 49, that organic stablizers can also be added including organotin compounds and metal soaps.

In Japanese Patent Publication No. 59/164352, published Sept. 17, 1984, it is disclosed that glycols in combination with a mixture of more than 10% by weight of monoalkyltin tris (alkylthioglycolate) and less than 90% weight of dialkyltin bis (alkylthioglycolate) are employed as heat stabilizers for halogen-containing resins. The glycol compounds are added to the organotin heat stabilizers in order to eliminate or reduce the turbidity and subsequently produced precipitate resulting from a mixture of the dialkyltin bis (alkylthioglycolates) with the monoalkyltin tris (alkylthioglycolates).

However, satisfactory stabilization of halogen-containing polymers for rigid articles against degradation caused by exposure to light, especially UV light, and outdoor weathering for extended periods of time, has not yet been satisfactorily obtained and a great need exists for a stabilizer system that will protect against this form of degradation as well as the heat degradation encountered during polymer processing and fabrication.

SUMMARY OF THE INVENTION

Compositions for stabilizing rigid (unplasticized) halogen-containing organic polymers against the deleterious and degradative effects of heat, light (especially ultra-violet light) and weathering, comprise organotin or non-tin metal salt primary heat stabilizers in combination with esters of polyhydrocarbyl ether glycols, preferably polyalkyl ether glycols. The invention also comprises halogen-containing organic polymers stabilized with such compositions and to a process of stabilizing rigid halogen-containing organic polymers against heat, light and weathering with such compositions.

DETAILED DESCRIPTION OF THE INVENTION

It has been discovered that when organotin and non-tin metal salt primary heat stabilizers are used in conjunction with esters of polyhydrocarbyl ether glycols, preferably polyalkyl ether glycols, rigid halogen-containing organic polymer compositions are stabilized against heat, light and weathering.

The halogen-containing organic polymers which are stabilized by the stabilizer compositions of this invention and which are useful in the polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. The vinyl halide homopolymers, vinyl halide copolymers and polymer blends containing vinyl halide homopolymers or vinyl halide copolymers usable in the practice of this invention may be, for example, (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha-chloroacrylate, styrene, vinyl ethers such as vinyl ethyl ether, vinyl chloroethyl ether, vinyl phenyl ether; vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate. Typical vinyl halide copolymers usable in this invention include vinyl chloride-vinyl acetate (87:13), vinyl chloride-vinylidene chloride (95:5), vinyl chloride-diethylfumarate (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer. The vinyl halide copolymers usable in the practice of this invention are copolymers comprising from 25 to 95 mole percent vinyl halide units. Of these polymers, the vinyl halide homopolymers are preferred.

Any suitable primary organotin heat stabilizer for halogen-containing organic polymers may be employed in the stabilizer compositions of this invention. Preferred are the organotin-sulfur compounds and organotin carboxylates.

The organotin-sulfur compounds useful in the practice of this invention are organotin sulfides, organotin mercaptides and mixtures thereof. The organotin sulfides are compounds which have one or more tetravalent tin atoms which each have at least one direct tin to carbon bond with the remainder of the valances on the tin atom being taken up by sulfur atoms. These organotin sulfides may be further described by the following general formulas:

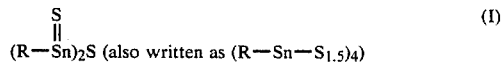

(R—Sn)$_2$S (also written as (R—Sn—S$_{1.5}$)$_4$)  (I)

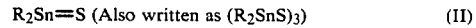

R$_2$Sn=S (Also written as (R$_2$SnS)$_3$)  (II)

where R is as defined below.

Examples of organotin sulfides useful in the practice of this invention include, but are not limited to, the following:

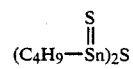

(C$_4$H$_9$—Sn)$_2$S

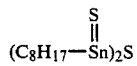

(C$_8$H$_{17}$—Sn)$_2$S

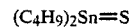

(C$_4$H$_9$)$_2$Sn=S

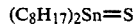

(C$_8$H$_{17}$)$_2$Sn=S

The organotin mercaptides useful in this invention are compounds which have at least one tetravalent tin atom which has one or two direct tin to carbon bond and at least one tin to sulfur to carbon (Sn—S—C) bond. These organotin mercaptides may be further described by the following general formulas:

R—Sn—X  (III)
   ‖
   W

R$_n$—Sn—X$_p$  (IV)

and

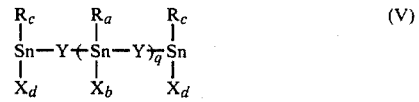

$$\begin{array}{ccc} R_c & R_a & R_c \\ | & | & | \\ Sn-Y(\!\!-\!Sn-Y\!\!)_{\overline{q}}Sn \\ | & | & | \\ X_d & X_b & X_d \end{array}$$  (V)

wherein wherein

X is at each independent occurrence selected from

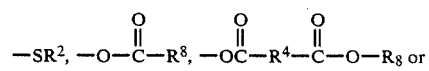

—SR$^2$, —O—C(=O)—R$^8$, —OC(=O)—R$^4$—C(=O)—O—R$_8$ or

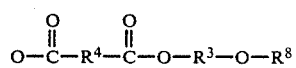

O—C(=O)—R$^4$—C(=O)—O—R$^3$—O—R$^8$ with the proviso that; (1) at least one X in formulas III and IV is —SR$^2$ and (2) in formula V at least one X is —SR$^2$ or at least one Y is —S—R$^3$—W—

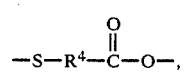

—S—R$^4$—C(=O)—O—,

-continued

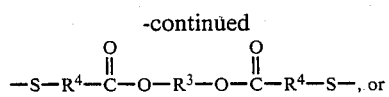, or

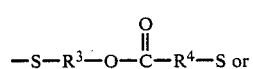 or

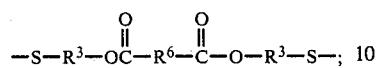;

Y is at each independent occurrence selected from

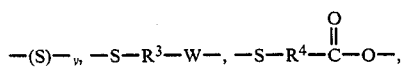

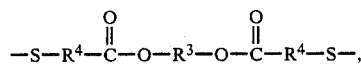,

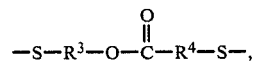,

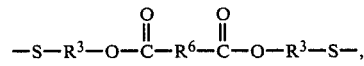,

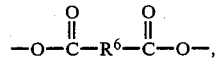,

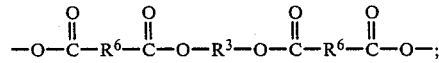;

W is at each independent occurrence selected from oxygen or sulfur;

R is at each independent occurrence selected from alkyl, alkenyl, cycloalkyl, cycloalkenyl,

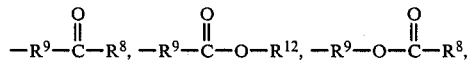,

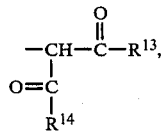, $-R^9-O-R^{12}$, $-R^9-CN$;

$R^2$ is at each independent occurrence selected from alkyl, alkenyl, cycloalkyl, cycloalkenyl,

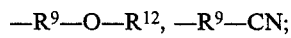,

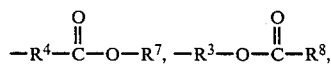

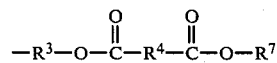,

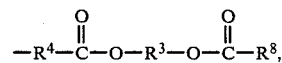,

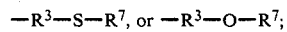;

$R^3$ is at each independent occurrence selected from alkylene of at least 2 carbon atoms, alkenylene of at least 2 carbon atoms, cycloalkylene, or cycloalkenylene;

$R^4$ is at each independent occurrence selected from alkylene, alkenylene, cycloalkylene, or cycloalkenylene;

$R^6$ is at each independent occurrence selected from a carbon-carbon bond, or $R^4$;

$R^7$ is at each independent occurrence selected from —H or $R^8$;

$R^8$ is at each independent occurrence selected from alkyl, alkenyl, cycloalkyl, or cycloalkenyl;

$R^9$ is at each independent occurrence selected from $C_1$ to $C_4$ alkylene;

$R^{12}$ is at each independent occurrence selected from —H or a monovalent $C_1$ to $C_{20}$ hydrocarbon radical;

$R^{13}$ and $R^{14}$ are at each independent occurrence selected from $C_1$ to $C_{20}$ alkyl or $C_1$ to $C_{20}$ alkoxy;

at each independent occurrence n=1 or 2 and p=4−n;

at each independent occurrence a=1 or 2; b=2−a; c=1 or 2; d=3−c; and q=0 or an integer from 1 to 4 inclusive; and v is at each independent occurrence selected from an integer from 1 to 8 inclusive.

In the above formulas, it is understood that formula V includes those organotin mercaptides which are cyclic, i.e. where formulas V would be written:

 or

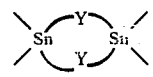

Examples of organotin mercaptides useful in the practice of this invention include, but are not limited to:

(1) alkyltin alkylthioalkanoates, including monoalkyltin tris(alkylthioalkanoates) and dialkyltin bis(alkylthioalkanoates), such as

monomethyltin tris (isooctylthioglycolate)

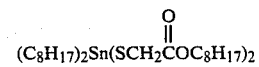

dioctyltin bis (isooctylthioglycolate)

monobutyltin tris (isooctylthioglycolate)

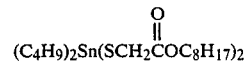

dibutyltin bis (isooctylthioglycolate)

(2) alkyltin mercaptoalkylalkanoates, including the monoalkyltin tris(mercaptoalkylalkanoates) and dialkyltin bis(mercaptoalkylalkanoates), such as

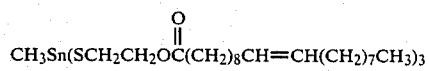

monomethyltin tris (mercaptoethyloleate)

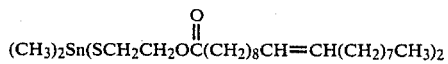

dimethyltin bis (mercaptoethyloleate)

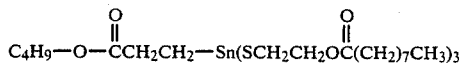

mono (beta-carbobutoxyethyl) tin tris (mercaptoethylpelargonate)

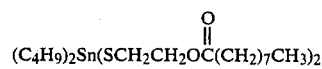

dibutyltin bis (mercaptoethylpelargonate)

(3) bis(alkyltin alkylthioalkanoate) sulfides, including the bis(monoalkyltin di(alkylthioalkanoate))sulfides and bis(dialkyltin mono(alkylthioalkanoate))-sulfides, such as

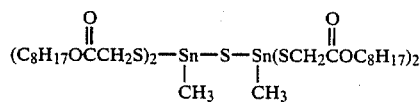

bis (monomethyltin di (isooctylthioglycolate)) sulfide

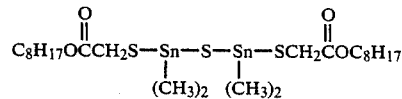

bis (dimethyltin mono (isooctylthioglycolate)) sulfide

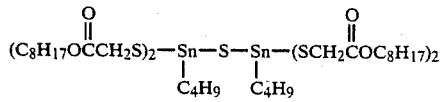

bis (monobutyltin di (isooctylthioglycolate)) sulfide

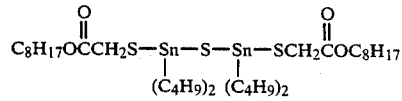

bis (dibutyltin mono (isooctylthioglycolate)) sulfide (4) bis(alkyltin mercaptoalkylalkanoate)sulfides, including bis(monoalkyltin di(mercaptoalkylalkanoates))sulfides and bis(dialkyltin mono(mercaptoalkylalkanoate))sulfides, such as (5) alkyltin alkylmercaptides, including monoalkyltin tris(alkylmercaptides) and dialkyltin bis(alkylmercaptides) such as

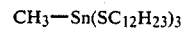

monomethyltin tris (lauryl mercaptide)

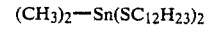

dimethyltin bis (lauryl mercaptide)

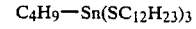

monobutyltin tris (lauryl mercaptide)

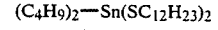

dibutyltin bis (lauryl mercaptide)

Particularly useful in the practice of this invention are mixtures of monoalkyltin and dialkyltin mercaptides.

The organotin carboxylates which may be employed in accordance with this invention are compounds which have tetravalent tin atoms which each have one or two direct tin to carbon bonds, the remainder of the bonds on the tin atoms being tin to oxygen to carbonyl, i.e. tin-carboxyl

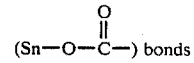 bonds

These organotin carboxylates may be further described by the following general formulas:

 (VI)

and

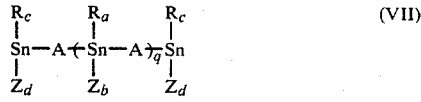 (VII)

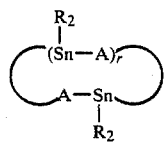 (VIII)

wherein R, n, p, a, b, c, d and q are as previously defined;

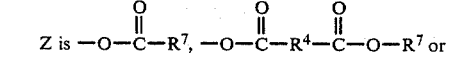

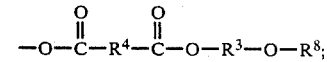

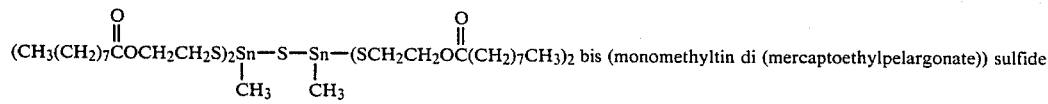 bis (monomethyltin di (mercaptoethylpelargonate)) sulfide

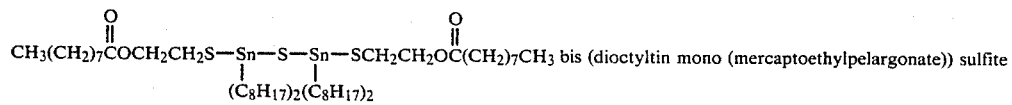 bis (dioctyltin mono (mercaptoethylpelargonate)) sulfite

A is

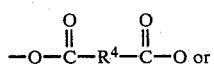

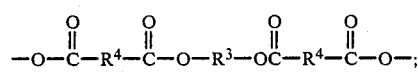

$R^3$, $R^4$, $R^7$ and $R^8$ are as previously defined; and r=0 or an integer; preferably about 1–20.

Examples of organotin carboxylates which are useful in the practice of this invention include, but are not limited to, alkyltin alkyl maleates, such as dibutyltin bis(butyl maleate), and polymeric alkyltin maleates, such as dibutyltin maleate.

Any suitable non-tin metal salt primary heat stabilizer for halogen-containing organic polymers may be employed in the stabilizer compositions of this invention. Thus, there can be used barium, strontium, calcium, cadmium, zinc, lead, magnesium, cobalt, nickel, titanium and aluminum salts of mercaptans, phenols, aromatic carboxylic acids, fatty acids or epoxy fatty acids. Additionally, antimony compounds such as antimony mercaptides, for example, antimony tris(isooctylthioglycolate), may also be employed as the primary heat stabilizer.

Examples of suitable salts include barium di(nonylphenolate), strontium di(nonylphenolate), strontium di(amylphenolate), barium di(octylphenolate), strontium di(octylphenolate), barium di(nonyl-o-cresolate), lead di(octylphenolate), cadmium-2-ethyl-hexoate, cadmium laurate, cadmium stearate, zinc caprylate, cadmium caprate, barium stearate, barium-2-ethylhexoate, barium laurate, barium ricinoleate, lead stearate, aluminum stearate, magnesium stearate, calcium octoate, calcium stearate, cadmium naphthenate, cadmium benzoate, cadmiun p-tert. butylbenzoate, barium octyl salicylate, cadmium epoxy stearate, strontium epoxy stearate, cadmium epoxy stearate, strontium epoxy stearate, cadmium salt of epoxidized acids of soybean oil, and lead epoxy stearate.

Especially preferred are the barium/cadmium, calcium/zinc, barium/zinc and barium/cadmium/zinc salts, such as barium di(nonylphenolate)/cadmium octoate.

The polyhydrocarbyl ether glycols useful in the stabilizer compositions of this invention are those of the general formula:

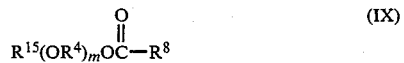
(IX)

wherein $R^4$ and $R^8$ are as previously defined, m is 2 or more, and $R^{15}$ is alkyl, alkenyl, cycloalkyl, cycloalkenyl or

Preferably the esters of the ether glycols have the general formula:

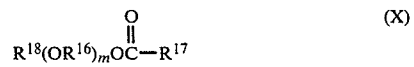
(X)

wherein m is 2 or more, $R^{16}$ is alkylene, $R^{17}$ is alkyl and $R^{18}$ is alkyl or

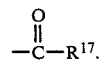

Most preferably $R^{16}$ is ethylene, $R^{17}$ is alkyl of from about 3 to 18 carbon atoms, $R^{18}$ is

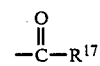

and m is an integer of 2, 3, 4 or an integer sufficient to provide a molecular weight of about 300 to about 600 for the polyethylene glycol moiety residue of the ester compounds.

As examples of suitable esters of polyhydrocarbyl ether glycols useful in this invention, there may be mentioned, for example, polyethylene glycol bis stearate, polyethylene glycol bis pelargonate, polyethylene glycol bis propionate, polyalkylene glycol bis laurate, polyalkylene glycol bis octanoate, triethylene glycol bis propionate, triethylene glycol bis stearate, triethylene glycol bis laurate, triethylene glycol bis pelargonate, tetraethylene glycol bis stearate, tetraethylene glycol bis laurate, tetraethylene glycol bis propionate, tetraethylene glycol bis octanoate, tetraethylene glycol bis pelargonate, diethylene glycol monomethyl ether stearate, diethylene glycol monomethyl ether laurate, diethylene glycol monomethyl ether propionate, tetraethyleneglycol diacrylate, triethyleneglycol dimethacrylate, triethyleneglycol monoethylether crotonate, diethyleneglycol monoethylether cyclohexanoate, tetraethyleneglycol dicyclohexanoate, polyethyleneglycol dicyclohexenoate, triethyleneglycol monoallylether pelargonate, triethyleneglycol monoallylether cyclohexenoate, bis(diethyleneglycol propionate) cyclohexyl ketal, bis(diethyleneglycol propionate) cyclohexene ketal, and diethylene glycol monomethyl ether pelargonate.

As used in the above formulas and throughout this specification, the term alkyl represents monovalent, straight or branched chain, saturated hydrocarbon radicals containing, for example, 1 to 20 carbon atoms and the term alkylene refers to divalent, straight or branched chain saturated hydrocarbon radicals containing, for example, 1 to 20 carbon atoms and the term alkynylene refers to trivalent straight or branched chain saturated hydrocarbon radicals containing, for example, 1 to 20 carbon atoms. The term alkenyl refers to monovalent, straight or branched chain $C_2$ to $C_{20}$ hydrocarbon radicals containing at least one double bond, and the term alkenylene refers to divalent $C_2$ to $C_{20}$ hydrocarbon radicals containing at least one double bond. The term cycloalkyl represents monovalent $C_3$ to $C_8$ saturated cycloaliphatic radicals; cycloalkylene refers to divalent $C_3$ to $C_8$ saturated cycloaliphatic radicals; cycloalkenyl refers to monovalent $C_5$ to $C_8$ cycloaliphatic radicals containing at least one double bond; and cycloalkenylene represents divalent $C_5$ to $C_8$ cycloaliphatic radicals containing at least one double bond. The term a multivalent hydrocarbyl group refers to groups such as alkylene, alkenylene, cycloalkylene, cycloalkenylene, alkynylene and tetravalent carbon, and the term a multivalent hydroxyl-substituted hydrocarbyl group refers to groups such as hydroxyl-substituted alkylene, alkenylene, cycloalkylene, cycloalkenylene alkynylene and tetravalent carbon.

The amount of organotin or non-tin metal salt primary heat stabilizer and ester of polyhydrocarbyl ether glycol in the stabilizer compositions of this invention will depend upon several factors, including, but not limited to, the particular organotin or non-tin metal salt primary heat stabilizer and ester of polyhydrocarbyl ether glycol employed, the particular resin which is intended to be stabilized, the severity of the heat, light and weather to which the resin will be subjected and the degree of stabilization desired. Thus, the amount of organotin or non-tin metal salt primary heat stabilizer and ester of polyhydrocarbyl ether glycol may vary considerably, it being required only that the stabilizer composition contain enough of each required component to stabilizer a halogen-containing organic polymer against the deterioration effects of heat, light and weathering, and that the ester of a polyhydrocarbyl ether glycol be present in an amount which will synergize such stabilization while at the same time being insufficient to plasticize the polymer.

In general, the stabilizer compositions in accordance with this invention which contain a primary heat stabilizer and an ester of a polyhydrocarbyl ether glycol employ these compounds in a weight ratio of primary heat stabilizer compound to ester of from about 2/1 to about 1/4, preferably from about 1/1 to about 1/4 and more preferably from about 2/3 to about 3/4. This corresponds to a stabilizer composition which contains roughly from about 33% to about 88% ester compound with the balance being primary heat stabilizer compound, the percentages being by weight based on the combined weight of the ester compound and primary heat stabilizer compound. These weight percentages may, of course, vary considerably depending upon the particular compounds selected and their molecular weights.

As with the relative amount of primary heat stabilizer and ester compound, the amount of stabilizer composition employed in the halogen-containing organic polymer compositions of this invention can vary considerably. The minimum amount of stabilizer in the polymer composition is that amount which will stabilize the polymer against the deteriorative effects of heat, light and weathering. While this minimum amount can vary depending upon the particular stabilizing composition components employed and their relative amounts, the particular polymer to be stabilized, the severity of the heat, light and weathering to which the polymer will be subjected and the degree of stabilization desired, in general about 1.0% to about 5.0% of stabilizer composition based on the weight of halogen-containing organic polymer will be sufficient to impart the desired properties to the polymer composition in most cases. Amounts greater than this minimum level of stabilizer can, of course, be employed, although at some point the increase in stabilization of the polymer is not commensurate with the additional amount of stabilizer employed. Thus, while there is no critical upper limit to the amount of stabilizer which may be employed, amounts in excess of about 8% do not give an increase in effectiveness which will justify the use of these higher amounts of stabilizer. In fact, amounts above about 8-10% of stabilizer composition may begin to plasticize the polymer and change its physical properties dramatically.

The stabilizer compositions of this invention can be made quite simply. For example, the primary heat stabilizers compound and ester compound can be simply combined physically as by mixing, blending, stirring, shaking or the like. Similarly, the halogen-containing organic polymer compositions of this invention may be prepared by physically blending the stabilizer composition and the polymer (plus any desired additives) in any convenient manner until the stabilizer composition is thoroughly dispersed throughout the polymer composition. In normal commercial practice this is accomplished by high intensity mixing. Alternatively, the stabilizing components can be added to the polymer individually.

The stabilized polymer compositions of this invention are useful to form a variety of rigid articles of manufacture, e.g. housing siding, window profiles and the like, and are especially useful in those articles which are exposed to light and weathering. A variety of conventional techniques may be employed to shape the polymer composition into the desired article.

The following examples illustrate the present invention. Unless otherwise indicated, all parts and percentages in the examples and throughout this specification are by weight. In the Table PHR refers to parts per hundred parts resin and color is rated on a scale of:

10→5→1 white→tan→brown.

In the compound of Control B "MEO" represents a mercapto ethyl oleate radical.

Examples 1 to 45 demonstrate the superior heat, light and weathering stabilization of compositions according to this invention which contain primarily heat stabilizer and an ester compound.

EXAMPLES 1 TO 18

The stabilizer compositions indicated in Table I were each in turn blended with a standard poly (vinyl chloride) formulation containing:

| INGREDIENT | PARTS BY WEIGHT | |
|---|---|---|
| Poly (vinyl chloride)-Geon 103 EP | | 100.0 |
| Process aid | | 1.5 |
| Impact modifier | | 6.0 |
| Pigment | Approx. | 1.0 |
| Paraffin wax | | 1.2 |
| Partially oxidized polyethylene | | 0.25 |

Each resulting polymer composition was then tested for stability to heat by milling on a two roll dynamic mill at about 180° C. Samples of each composition were taken at 2 minutes intervals of milling and examined for degradation and discoloration. The results are indicated in Table I. Included in the testing for comparison purposes were Control Compositions (A, B, C and D) of the primary heat stabilizer component.

TABLE I

| Example No. | Stabilizer Composition | PHR | 2 | 4 | 6 | 8 | 10 | 14 | 18 | 22 | 26 | 30 | 34 |
|---|---|---|---|---|---|---|---|---|---|---|---|---|---|
| | | | | | | | Time (minutes) Color | | | | | | |
| | STABILIZER A | | | | | | | | | | | | |
| Control A | $(CH_3)_2Sn(SCH_2\overset{O}{\overset{\|}{C}}OC_8H_{17})_2$ | 80% 1.5 | 10 | 10 | 10 | 10 | 10 | 9 | 8 | 7 | 3 | 1 | 1 |
| | $CH_3Sn(CH_2\overset{O}{\overset{\|}{C}}OC_8H_{17})_3$ | 20% | | | | | | | | | | | |
| 1 | STAB A<br>Tetraethyleneglycol bis(propionate) | 1.5<br>1.5 | 10 | 10 | 10 | 10 | 10 | 9 | 8 | 8 | 3 | 2 | 1 |
| 2 | STAB A<br>Triethyleneglycol bis(propionate) | 1.5<br>1.5 | 10 | 10 | 10 | 10 | 10 | 9 | 8 | 7 | 3 | 1 | 1 |
| 3 | STAB A<br>Tetraethyleneglycol bis(pelargonate) | 1.5<br>1.5 | 10 | 10 | 10 | 10 | 10 | 9 | 8 | 7 | 4 | 2 | 1 |
| 4 | STAB A<br>Tetraethyleneglycol bis(stearate) | 1.5<br>2.0 | 10 | 10 | 10 | 10 | 10 | 9 | 8 | 7 | 3 | 1 | 1 |
| 5 | STAB A<br>Tetraethyleneglycol (400) bis(pelargonate) | 1.5<br>1.5 | 10 | 10 | 10 | 10 | 10 | 9 | 8 | 7 | 3 | 2 | 1 |
| 6 | STAB A<br>Diethyleneglycol monoethyl ether propionate | 1.5<br>1.5 | 10 | 10 | 10 | 10 | 10 | 9 | 8 | 7 | 3 | 2 | 2 |
| | STABILIZER B | | | | | | | | | | | | |
| Control B | $CH_3-Sn-S-Sn-CH_3$<br>$\quad\quad\;\;\|\quad\quad\quad\;\;\|$<br>$\;\;\;(MEO)_2\;\;\;(MEO)_2$ | 1.0 | 10 | 10 | 10 | 9 | 9 | 6 | 4 | 1 | | | |
| 7 | STAB B<br>Tetraethyleneglycol bis(propionate) | 1.0<br>1.5 | 10 | 10 | 10 | 9 | 9 | 6 | 4 | 1 | | | |
| 8 | STAB B<br>Tetraethyleneglycol bis(stearate) | 1.0<br>2.0 | 10 | 10 | 10 | 9 | 9 | 6 | 3 | 2 | | | |
| 9 | STAB B<br>Polyethyleneglycol (300) bis(pelaragonate) | 1.0<br>1.5 | 10 | 10 | 10 | 9 | 9 | 6 | 4 | 1 | | | |
| 10 | STAB B<br>Diethyleneglycol monoethyl ether stearate | 1.0<br>2.0 | 10 | 10 | 10 | 9 | 9 | 6 | 5 | 2 | | | |
| | STABILIZER C | | | | | | | | | | | | |
| Control C | $(C_4H_9)_2Sn\left(\begin{array}{c}O\quad\quad\;\;O\\ \|\!/\!=\!\backslash\!\|\\OC\quad\quad COC_4H_9\end{array}\right)_2$ | 2.5 | 9 | 8 | 8 | 7 | 7 | 6 | 3 | 2 | | | |
| 11 | STAB C<br>Tetraethyleneglycol bis(propionate) | 2.5<br>1.5 | 9 | 8 | 8 | 7 | 7 | 6 | 2 | 1 | | | |
| 12 | STAB C<br>Tetraethyleneglycol bis(stearate) | 2.5<br>2.0 | 9 | 8 | 8 | 7 | 7 | 6 | 3 | 2 | | | |
| 13 | STAB C<br>Polyethyleneglycol (300) pelargaonate | 2.5<br>1.5 | 9 | 8 | 8 | 7 | 7 | 6 | 3 | 2 | | | |
| 14 | STAB C<br>Diethyleneglycol monethyl ether stearate | 2.5<br>2.0 | 9 | 8 | 8 | 7 | 7 | 6 | 2 | 1 | | | |
| | STABILIZER D | | | | | | | | | | | | |
| Control D | $Ba\left(-O-\bigcirc-C_9H_{19}\right)_2 /$<br><br>$Cd\left(\begin{array}{c}O\\ \|\\OCCH(CH_2)_3CH_3\\ \|\\C_2H_5\end{array}\right)_2$ | 2.0 | 10 | 9 | 9 | 9 | 8 | 8 | 6 | 1 | | | |

TABLE I-continued

| Example No. | Stabilizer Composition | PHR | 2 | 4 | 6 | 8 | 10 | 14 | 18 | 22 | 26 | 30 | 34 |
|---|---|---|---|---|---|---|---|---|---|---|---|---|---|
| | | | | | | | Color | | | | | | |
| 15 | STAB D | 2.0 | 10 | 9 | 9 | 9 | 8 | 8 | 6 | 1 | | | |
| | Tetraethyleneglycol bis(propionate) | 1.5 | | | | | | | | | | | |
| 16 | STAB D | 2.0 | 10 | 9 | 9 | 9 | 8 | 8 | 4 | 1 | | | |
| | Tetraethyleneglycol bis(stearate) | 2.0 | | | | | | | | | | | |
| 17 | STAB D | 2.0 | 10 | 9 | 9 | 9 | 8 | 8 | 4 | 1 | | | |
| | Polyethyleneglycol (300) pelargonate | 1.5 | | | | | | | | | | | |
| 18 | STAB D | 2.0 | 10 | 9 | 9 | 9 | 8 | 8 | 6 | 1 | | | |
| | Diethyleneglycol monoethyl ether stearate | 2.0 | | | | | | | | | | | |

EXAMPLES 19 TO 45

Stabilizer compositions indicated in Table II were each in turn blended with the same standard poly (vinyl chloride) formulation used for the heat stability tests. Each resulting polymer composition was then formed into a plaque and tested for stability to light and weathering by exposing it to ultra-violet light (UV) and moisture in a Q-Panel QUV accelerated weathering tester. Each plaque was weathering at 50° C. by exposing it to 4 hours of UV followed by 4 hours of a moisture condensation cycle. This was repeated until the plaque had been exposed for 750 hours, samples being taken for evaluation every 150 hours. The results of these tests are summarized in Table II. Included in the testing for comparison purposes were Control Compositions (A, B, C and D) of the primary heat stabilizer component.

TABLE II

| Example No. | Stabilizer Composition | PHR | 0 | 150 | 300 | 400 | 600 | 750 |
|---|---|---|---|---|---|---|---|---|
| | | | | | Color | | | |
| | STABILIZER A | | | | | | | |
| Control A | $(CH_3)_2Sn(SCH_2\overset{O}{\overset{\|}{C}}OC_8H_{17})_2$ 80% | 1.5 | 10 | 5 | 3 | 2 | 1 | 1 |
| | $CH_3Sn(SCH_2\overset{O}{\overset{\|}{C}}OC_8H_{17})_3$ 20% | | | | | | | |
| 19 | STAB A | 1.5 | 10 | 9 | 8 | 6 | 5 | 2 |
| | Tetraethyleneglycol bis(propionate) | 1.5 | | | | | | |
| 20 | STAB A | 1.5 | 10 | 8 | 7 | 4 | 4 | 2 |
| | Triethyleneglycol bis(propionate) | 1.5 | | | | | | |
| 21 | STAB A | 1.5 | 10 | 9 | 8 | 8 | 6 | 6 |
| | Tetraethyleneglycol bis(pelargonate) | 1.5 | | | | | | |
| 22 | STAB A | 1.5 | 10 | 9 | 7 | 6 | 5 | 5 |
| | Tetraethyleneglycol bis(laurate) | 1.5 | | | | | | |
| 23 | STAB A | 1.5 | 10 | 9 | 8 | 7 | 7 | 5 |
| | Triethyleneglycol bis(stearate) | 1.5 | | | | | | |
| 24 | STAB A | 1.5 | 10 | 9 | 7 | 7 | 6 | 5 |
| | Polyethyleneglycol (400) bis(propionte) | 1.5 | | | | | | |
| 25 | STAB A | 1.5 | 10 | 9 | 8 | 7 | 7 | 6 |
| | Polyethyleneglycol (400) bis(propionate) | 2.0 | | | | | | |
| 26 | STAB A | 1.5 | 10 | 9 | 7 | 7 | 6 | 5 |
| | Polyethyleneglycol (600) bis(propionate) | 2.0 | | | | | | |
| 27 | STAB A | 1.5 | 10 | 9 | 8 | 7 | 7 | 6 |
| | Polyethyleneglycol (600) bis(stearate) | 2.0 | | | | | | |
| 28 | STAB A | 1.5 | 10 | 9 | 7 | 7 | 6 | 5 |
| | Diethyleneglycol monoethyl ether propionate | 1.5 | | | | | | |
| 29 | STAB A | 1.5 | 10 | 9 | 8 | 7 | 7 | 6 |
| | Diethyleneglycol monoethyl ether stearate | 2.0 | | | | | | |
| | STABILIZER B | | | | | | | |
| Control B | $CH_3-Sn-S-Sn-CH_3$ <br> $\|\qquad\quad\|$ <br> $(MEO)_2\ \ (MEO)_2$ | 1.0 | 10 | 7 | 5 | 1 | 2 | 2 |
| 30 | STAB B | 1.0 | 10 | 9 | 7 | 2 | 3 | 3 |

TABLE II-continued

| Example No. | Stabilizer Composition | PHR | 0 | 150 | 300 | 400 | 600 | 750 |
|---|---|---|---|---|---|---|---|---|
| | | | | | Color | | | |
| | Tetraethyleneglycol bis(propionate) | 1.5 | | | | | | |
| 31 | STAB B | 1.0 | 10 | 9 | 7 | 6 | 5 | 5 |
| | Tetraethyleneglycol bis(stearate) | 2.0 | | | | | | |
| 32 | STAB B | 1.0 | 10 | 9 | 7 | 6 | 5 | 5 |
| | Tetraethyleneglycol bis(octanoate) | 1.5 | | | | | | |
| 33 | STAB B | 1.0 | 10 | 9 | 7 | 2 | 3 | 3 |
| | Polyethyleneglycol (300) bis(pelargonate) | 1.5 | | | | | | |
| 34 | STAB B | 1.0 | 10 | 9 | 8 | 7 | 8 | 8 |
| | Diethyleneglycol monoethyl ether stearate | 1.5 | | | | | | |
| | STABILIZER C | | | | | | | |
| Control C | $(C_4H_9)_2Sn\left(\overset{O}{\underset{\|}{OC}}\diagup\overset{O}{\underset{\|}{COC_4H_9}}\right)_2$ | 2.5 | 9 | 10 | 8 | 6 | 6 | 7 |
| 35 | STAB C | 2.5 | 9 | 10 | 9 | 7 | 7 | 7 |
| | Tetraethyleneglycol bis(propionate) | 1.5 | | | | | | |
| 36 | STAB C | 2.5 | 9 | 10 | 9 | 7 | 7 | 7 |
| | tetraethyleneglycol bis(stearate) | 1.5 | | | | | | |
| 37 | STAB C | 2.5 | 9 | 10 | 9 | 8 | 7 | 7 |
| | Tetraethyleneglycol bis(octanoate) | 1.5 | | | | | | |
| 38 | STAB C | 2.5 | 9 | 10 | 9 | 7 | 7 | 7 |
| | Polyethyleneglycol (300) bis(pelargonate) | 1.5 | | | | | | |
| 39 | STAB C | 2.5 | 9 | 10 | 9 | 8 | 8 | 8 |
| | Diethyleneglycol monoethyl ether stearate | 2.0 | | | | | | |
| | STABILIZER D | | | | | | | |
| Control D | $Ba(-O-\bigcirc-C_9H_{19})_2/$ | 2.0 | 10 | 6 | 3 | 2 | 4 | 2 |
| | $Cd(O\overset{O}{\underset{\|}{C}}CH(CH_2)_3CH_3)_2$<br>$\mid$<br>$C_2H_5$ | | | | | | | |
| 40 | STAB D | 3.5 | 10 | 7 | 5 | 5 | 6 | 6 |
| 41 | STAB D | 2.0 | 10 | 9 | 4 | 4 | 5 | 5 |
| | Tetraethyleneglycol bis(propionate) | 1.5 | | | | | | |
| 42 | STAB D | 2.0 | 10 | 9 | 5 | 5 | 6 | 6 |
| | Tetraethyleneglycol bis(stearate) | 2.0 | | | | | | |
| 43 | STAB D | 2.0 | 10 | 9 | 5 | 5 | 6 | 6 |
| | Tetraethyleneglycol bis(octanoate) | 2.0 | | | | | | |
| 44 | STAB D | 2.0 | 10 | 9 | 4 | 4 | 5 | 5 |
| | Polyethyleneglycol (300) bsi(pelargonate) | 1.5 | | | | | | |
| 45 | STAB D | 2.0 | 10 | 9 | 6 | 5 | 6 | 6 |
| | Diethyleneglycol monoethyl ether stearate | 2.0 | | | | | | |

The heat stability results in Table I demonstrate that the primary heat stabilizers are excellent heat stabilizers and that employing the esters of polyalkyl ether glycols of Formula IX with said primary heat stabilizers does not adversely affect nor significantly improve the heat stabilizing efficiency of the primary heat stabilizers.

The weathering and light stability results in Table II demonstrate that while most primary heat stabilizers are poor weathering and light stabilizers and polymer compositions containing only these stabilizers produce severe early discoloration after only about 150 hours. Yet, polymer compositions containing esters of polyalkyl ether glycol in combination with the primary heat stabilizers provide excellent weathering and light stability which is quite surprising in view of the poor weathering and light stabilization of the primary heat stabilizers.

What is claimed is:

1. A composition for stabilizing rigid halogen-containing organic polymers against the deteriorative effects of heat, ultra-violet light and weathering, said composition comprising a mixture of:

(a) an organotin or non-tin metal salt primary heat stabilizer; and
(b) in an amount sufficient to synergize the stabilization of the halogen-containing organic polymer but insufficient to plasticize said polymer, an ester of a polyhydrocarbyl ether glycol of the formula:

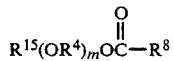

wherein $R^4$ is selected from the group consisting of alkylene, alkenylene, cycloalkylene and cycloalkenylene, $R^8$ is selected from the groups consisting of alkyl, alkenyl, cycloalkyl and cycloalkenyl, $R^{15}$ is

and m is an integer of 2 or more.

2. A composition of claim 1 wherein the ester of a polyhydrocarbyl ether glycol is one of which $R^4$ is alkylene and $R^8$ is alkyl.

3. A composition of claim 1 wherein the ester of a polyhydrocarbyl ether glycol is an alkyl ester of a polyalkyl ether glycol selected from the group consisting of polyethylene glycol, triethylene glycol and tetraethylene glycol.

4. A composition of claim 2 wherein the primary heat stabilizer is an organotin compound or mixture of organotin compounds selected from the group consisting of an organotin sulfides, organotin mercaptides, organotin carboxylates and mixtures thereof.

5. A composition of claim 2 wherein the primary heat stabilizer a non-tin metal salt or mixtures thereof selected from the group consisting of barium, calcium, cadmium, zinc and antimony salts and mixtures thereof.

6. A composition of claim 4 wherein the organotin compound is selected from dimethyltin bis(isooctylthioglycolate), monomethyltin tris(isooctylthioglycolate), bis(monomethyltin di(2-mercaptoethyloleate)) sulfide, bis(dimethyltin (2-mercaptoethyloleate) sulfide, dibutyltin bis(butyl maleate) and mixtures thereof.

7. A composition of claim 5 wherein the non-tin metal salt is selected from the group consisting of antimony tris(isooctylthioglycolate), barium/cadmium, calcium/zinc, barium/zinc and barium/cadmium/zinc salts mixtures.

8. A composition of claim 7 wherein the primary heat stabilizer is a mixture of barium di(octylphenolate) and cadmium-2-ethylhexoate.

9. A composition of claim 2 wherein the weight ratio of the primary heat stabilizer to the ester compound is from about 1/1 to about 1/4.

10. A composition of claim 9 wherein the weight ratio of the primary heat stabilizer to ester compound is from about 2/3 to about 3/4.

11. A composition comprising a rigid halogen-containing organic polymer and, in an amount sufficient to stabilize said polymer against the deteriorative effects of heat, ultra-violet light and weathering, a stabilizer composition comprising a mixture of:
(a) an organotin or non-tin metal salt primary heat stabilizer; and
(b) in an amount sufficient to synergize the stabilization of the halogen-containing organic polymer but insufficient to plasticize said polymer, an ester of a polyhydrocarbyl ether glycol of the formula:

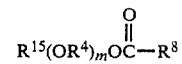

wherein $R^4$ is selected from the group consisting of alkylene, alkenylene, cycloalkylene and cycloalkenylene, $R^8$ is selected from the groups consisting of alkyl, alkenyl, cycloalkyl and cycloalkenyl, $R^{15}$ is

and m is an integer of 2 or more.

12. A compositions according to claim 11 wherein the ester of a polyhydrocarbyl ether glycol is one in which $R^4$ is alkylene and $R^8$ is alkyl.

13. A composition according to claim 11 wherein the ester of a polyhydrocarbyl ether glycol is an alkyl ester of a polyalkyl ether glycol selected from the group consisting of polyethylene glycol, triethylene glycol and tetraethylene glycol.

14. A composition according to claim 11 wherein the primary heat stabilizer a non-tin metal salt or mixtures thereof selected from the group consisting of barium, calcium, cadmium, zinc and antimony salts and mixtures thereof.

15. A composition according to claim 11 wherein the organotin compound is selected from dimethyltin bis(isooctylthioglycolate), monomethyltin tris(isooctylthioglycolate), bis(monomethyltin di(2-mercaptoethyloleate)) sulfide, bis(dimethyltin (2-mercaptoethyloleate)) sulfide, dibutyltin bis(butyl maleate) and mixtures thereof.

16. A composition according to claim 11 wherein the non-tin metal salt is selected from the group consisting of antimony tris(isooctylthioglycolate), barium/cadmium, calcium/zinc, barium/zinc and barium/cadmium/zinc salts mixtures.

17. A composition according to claim 11 wherein the primary heat stabilizer is a mixture of barium di(octylphenolate) and cadmium-2-ethylhexoate.

18. A composition according to claim 11 wherein the weight ratio of the primary heat stabilizer to the ester compound is from about 1/1 to about 1/4.

19. A composition according to claim 11 wherein the weight ratio of the primary heat stabilizer to ester compound is from about 2/3 to about 3/4.

20. A composition according to claim 12 which contains from about 1.0 to about 5.0 weight % of the stabilizer composition based on the weight of the halogen-containing organic polymer.

21. A composition of claim 12 in which the halogen-containing organic polymer is a rigid polyvinyl chloride polymer.

22. A composition of claim 20 in which the halogen-containing organic polymer is a rigid polyvinyl chloride polymer.

23. A process for stabilizing a rigid halogen-containing organic polymer against the deteriorative effects of heat, ultra-violet light and weathering comprising admixing with said halogen-contaning organic polymer a stabilizing effective amount of:
(a) an organotin or non-tin metal salt primary heat stabilizer; and (b) in an amount sufficient to synergize the stabilization of the halogen-containing organic polymer but insufficient to plasticize said polymer, an ester of a polyhydrocarbyl ether glycol of the formula:

$$R^{15}(OR^4)_m O\overset{O}{\underset{\|}{C}}-R^8$$

wherein $R^4$ is selected from the group consisting of alkylene, alkenylene, cycloalkylene and cycloalkenylene, $R^8$ is selected from the groups consisting of alkyl, alkenyl, cycloalkyl and cycloalkenyl, $R^{15}$ is $$-\overset{O}{\underset{\|}{C}}-R^8$$

and m is an integer of 2 or more.

24. A process according to claim 23 wherein the ester of a polyhydrocarbyl ether glycol is one in which $R^4$ is alkylene and $R^8$ is alkyl.

* * * * *